Patented Dec. 25, 1928.

1,696,688

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

MOLD FOR HIGH-TEMPERATURE CASTING OF REFRACTORY BODIES.

No Drawing.   Application filed September 28, 1926.   Serial No. 138,332.

My invention relates to molds for casting refractory bodies at high temperatures and has special reference to molds for casting fused refractory bodies, typically consisting of mullite and a vitreous matrix, which must be melted and cast at high temperatures, exceeding 3200° F.

The object of my invention is to provide an improved mold of the character indicated, which can be used repeatedly and which shall be mechanically stronger and less subject to corrosion in use than the molds which have heretofore been employed for similar purposes.

The present invention proposes to use for making such molds a material consisting of fused silica and a calcium silicate bond, this material being prepared by mixing comminuted fused silica with lime, molding the mixture into the desired molds or mold parts, and heating the molded articles to harden them. Such heating may be done by steaming under pressure, or by burning in a kiln.

It has been customary heretofore to employ sand molds for casting fused refractory bodies at high temperatures. Such sand molds have been prepared from quartz sand and a binder of oil or the like. Such sand molds disintegrate readily under the conditions of use, and, therefore, such a mold can be used once only. Also, such a sand mold is not mechanically strong and since sand molds of this kind must be made anew for each article that is cast, their labor cost is considerable. They have the further disadvantages that the quartz sand combines more or less with the cast material, and also, that the quartz sand expands and contracts considerably with changes in temperature, so that casting in such molds at very elevated temperatures is accompanied by a greater or less distortion of the mold.

Fused silica differs from quartz sand in that it has a very low coefficient of expansion and it is substantially more resistant than quartz sand to corrosion by molten refractory materals. When bonded in the manner described herein, it has sufficient mechanical strength to withstand repeated use, and it presents a smooth molding surface.

An important advantage of using fused silica rather than the natural rock or any crystallized form is that the fused silica has a substantial portion in an amorphous form and thus has the above mentioned very low coefficient of expanion and relatively high resistance to corrosion by molten refractory materials.

In preparing molds according to my present invention, fused silica is comminuted to a suitable degree of fineness, preferably at least fine enough to pass through a 20-mesh screen, and this comminuted fused silica is mixed with ground quicklime or water-slacked lime. At least 6% of lime should be used in the mixture and I prefer that 15 to 20 parts of lime be used with 85 to 80 parts of fused silica. I also prefer to employ quicklime as a starting material, although, as stated above, water-slacked lime may be used, if desired.

The dry mixture of fused silica and lime is wetted sufficiently for molding. I prefer to mold this material by dry-pressing methods, for which purpose the material should contain not over 12% of water and is pressed in molds under heavy hydraulic pressure.

The molded material is then heated for the purpose of hardening it. The heat-treatment may be carried out by exposing the molded articles to saturated steam for six to eight hours, or longer, under a substantial pressure, which may be of the order of 40 pounds per square inch, or may be considerably higher if desired.

The heat-treatment of the molded material may be carried out by burning in a kiln at a temperature of the order of 2200° F., without the use of steam. In either case, the heat-treatment causes a portion of the silica to combine with the lime, producing a bond consisting mainly of calcium metasilicate with other calcium silicates.

The molds manufactured in the manner described above may be made either in one piece or in slabs to be assembled together to form the molds.

In the appended claims, the term "lime" is intended to include both quicklime and water-slacked lime.

I claim as my invention:

1. A mold for high-temperature casting, composed of comminuted fused silica bonded with calcium silicate material.

2. A mold for high-temperature casting, composed of comminuted fused silica and lime molded under pressure and hardened by heat.

3. The process of making a mold for high temperature casting, that comprises mixing comminuted fused silica and comminuted lime, adding sufficient water for molding, molding the resulting mixture, and hardening the molded material by heat.

4. The process of making a mold for high temperature casting, that comprises mixing comminuted fused silica and comminuted lime, adding sufficient water for dry-pressing, dry-pressing the resulting mixture, and hardening the molded material by heat.

5. The process of making a mold for high-temperature casting, that comprises mixing comminuted fused silica and comminuted lime, adding sufficient water for molding, molding the resulting mixture and hardening the molded material by treatment with steam under pressure.

6. The process of making a mold for high-temperature casting, that comprises mixing comminuted fused silica and comminuted lime, adding sufficient water for dry pressing, dry-pressing the resulting mixture and hardening the molded material by treatment with steam under pressure.

7. The process of making a mold for high-temperature casting, that comprises mixing 80 to 85 parts of fused silica, comminuted to at least 20-mesh fineness, with 20 to 15 parts of comminuted lime, adding sufficient water for molding, molding the resulting mixture, and hardening the molded material by heat.

8. The process of making a mold for high temperature casting, that comprises mixing 80 to 85 parts of fused silica, comminuted to at least 20-mesh fineness with 20 to 15 parts of comminuted lime, adding sufficient water for dry pressing, dry pressing the resulting mixture and hardening the molded material by heat.

9. The process of making a mold for high temperature casting, that comprises mixing 80 to 85 parts of fused silica, comminuted to at least 20-mesh fineness with 20 to 15 parts of comminuted lime, adding sufficient water for molding, molding the resulting mixture and hardening the molded material by heat in the presence of steam.

10. The process of making a mold for high temperature casting, that comprises mixing 80 to 85 parts of fused silica, comminuted to at least 20-mesh fineness with 20 to 15 parts of comminuted lime, adding sufficient water for dry pressing, dry pressing the resulting mixture, and hardening the molded material by heat in the presence of steam.

11. The process of making a mold for high temperature casting, that comprises mixing comminuted fused silica, of which a material portion is amorphous, and comminuted lime, adding sufficient water for molding, molding the resulting mixture and hardening the molded material by treatment with steam under pressure.

12. The process of making a mold for high temperature casting, that comprises mixing 80 to 85 parts of fused silica, of which a material portion is amorphous, comminuted to at least 20-mesh fineness, with 20 to 15 parts of comminuted lime, adding sufficient water for dry pressing, dry pressing the resulting mixture, and hardening the molded material by heat in the presence of steam.

Signed at Hartford, Connecticut this 25th day of September, 1926.

KARL E. PEILER.